United States Patent [19]

Kagayama

[11] Patent Number: 5,332,183
[45] Date of Patent: Jul. 26, 1994

[54] ATTACHMENT APPARATUS FOR TWO-WHEELED VEHICLE PARTS FOR ENABLING HIGHLY RELIABLE ATTACHMENT

[75] Inventor: Joe K. Kagayama, Osaka, Japan

[73] Assignee: Cat Eye Co., Ltd., Osaka, Japan

[21] Appl. No.: 837,864

[22] Filed: Feb. 18, 1992

[51] Int. Cl.$^5$ .............................................. F16M 13/00
[52] U.S. Cl. ................................. 248/222.1; 248/187; 224/30 A
[58] Field of Search ............... 248/225.1, 222.1, 221.3, 248/223.4, 231.5, 298, 187; 224/30 R, 30 A

[56] References Cited

U.S. PATENT DOCUMENTS

| | | | |
|---|---|---|---|
| 2,680,000 | 6/1954 | Pulver | 248/223.4 X |
| 2,897,928 | 8/1959 | Selig | 248/224.1 X |
| 3,631,572 | 1/1972 | Lange | 248/223.4 X |
| 3,881,677 | 5/1975 | Ihlenfeld | 248/224.1 X |
| 4,346,868 | 8/1982 | Lindner | 248/223.4 X |
| 4,618,081 | 10/1986 | Miree | 224/30 A X |
| 4,948,085 | 8/1990 | Mittelhauser | 248/223.4 X |
| 5,181,774 | 1/1993 | Lane | 224/30 A X |

FOREIGN PATENT DOCUMENTS 537726 10/1955 Belgium ............................. 248/187

*Primary Examiner*—Karen J. Chotkowski
*Attorney, Agent, or Firm*—Allegretti & Witcoff, Ltd.

[57] ABSTRACT

An attachment apparatus for two-wheeled vehicle parts in accordance with the present invention includes: a first fitting portion formed on an attachment part attached to component parts of a two-wheeled vehicle and having a single rail-shaped projection that has its one end open and has a recess formed in a portion of the projection; and a second fitting portion formed on an attachment part fixed to the two-wheeled vehicle parts and including a single groove that is slidably fit on the rail-shaped projection and including a projection piece having a jutted portion formed on a tip end of the projection piece and movable in a direction of crossing over the groove, the jutted portion being engaged with the recess of the projection in the groove. When a second attachment part is attached to a first attachment part by a fitting of the first and second fitting portions, the projected piece moves with the projection fit in the groove, so that the recess and the jutted portion are engaged with each other, thereby preventing a release of the fitting of the first and second fitting portions.

7 Claims, 14 Drawing Sheets

ATTACHMENT APPARATUS FOR TWO-WHEELED VEHICLE PARTS FOR ENABLING HIGHLY RELIABLE ATTACHMENT

BACKGROUND OF THE INVENTION

1. Field of the Invention

The present invention relates to attachment apparatus for two-wheeled vehicle parts and, more particularly, to an attachment apparatus for use in attaching bicycle parts such as a head lamp or the like to a bicycle.

2. Description of the Background Art

FIG. 23 is a side view of a head lamp for a bicycle that is attached to a handle of the bicycle by employing a conventional attachment method; and FIG. 24 is a front view showing the attachment of the bicycle head lamp of FIG. 23.

Referring to FIGS. 23 and 24, an attachment part A51 that includes an upper member 55 pivotal on a pin 11 and a lower member 57 is attached through a rubber 31 to a handle 27. An attachment part B53 attached to a lower portion of a head lamp 29 is slidably engaged with an upper portion of upper member 55.

FIG. 25 is an exploded perspective view showing the state where attachment parts A51 and B53 shown in FIGS. 23 and 24 are detached.

Referring to FIG. 25, a pair of rail members 59a and 59b are formed in the upper portion of attachment part A51. A tapped hole 13 is formed between rail members 59a and 59b. A recess 63 is formed in a portion in an opposite direction from the direction of tapped hole 13 between rail members 59a and 59b. Attachment part A51 is formed of upper member 55 and lower member 57, which are both pivotal on pin 11. This allows attachment part A51 to be attached to tubular component parts of the bicycle such as a handle or the like.

Grooves 60a and 60b that are slidable with respect to rail members 59a and 59b of attachment part A51 are formed in a lower portion of attachment part B53. A flat engagement piece 61 partially projected from attachment part A51 is formed between grooves 60a and 60b. An attachment hole 23 is an aperture provided for attaching attachment part B53 to head lamp 29 by employing a screw or the like.

FIG. 26 is a view showing the state where grooves 60a and 60b of attachment part B53 in the conventional example are sliding while fitting on rail members 59a and 59b of attachment part A51.

Referring to FIG. 26, engagement piece 61 that is made of, e.g., plastic resin and attached to the lower portion of attachment part A51 has a projection 65 formed in its lower portion. Projection 65 is in the form of being engaged with recess 63. As shown in FIG. 26, when attachment part B53 moves in an "A" direction, a spheroidal portion of a tip end of engagement piece 61 first makes contact with a protrusion 64 of upper member 55 of attachment part A51. Since engagement piece 61 is formed of plastic resin, engagement piece 61 deforms to deflect upward so that engagement piece 61 may avoid a collision caused by the contact with protrusion 64. Then, engagement piece 61 deforms further upward by contacts between projection 65 and protrusion 64.

FIG. 27 is a cross-sectional view showing the state where attachment parts A51 and B53 are completely engaged with each other from the state shown in FIG. 26.

Referring to FIG. 27, projection 65 on engagement piece 61 is engaged with recess 63 formed in upper member 55 when going completely beyond protrusion 64. This engagement between projection 65 and recess 63 prevents disengagement of attachment part B53 even if a force is applied in a direction in which attachment part B53 is disengaged, i.e., a "B" direction.

A sufficient attachment strength is not provided in the above-described conventional attachment apparatus for bicycle parts. With reference to FIG. 27, attachment part B53 is not detached from attachment part A51 due to the engagement between projection 65 and recess 63 in the stage that a small force is applied in the "B" direction. However, as shown in FIG. 26, engagement piece 61 has an elastic state such as of plastic resin. Thus, when a force larger than a predetermined force is applied in the "B" direction, engagement piece 61 is liable to be deformed in such form as shown in FIG. 26 by the applied force, thereby releasing the engagement. As described above, there is no sufficient reliability in the engagement between attachment parts A51 and B53. Particularly, no sufficient attachment strength is provided in view of vibration applied by the use of bicycles or the like.

SUMMARY OF THE INVENTION

One object of the present invention is to provide an attachment apparatus for two-wheeled vehicle parts capable of easily attaching the two-wheeled vehicle parts.

Another object of the present invention is to provide an attachment apparatus for two-wheeled vehicle parts capable of firmly attaching the two-wheeled vehicle parts.

A further object of the present invention is to provide a highly economical attachment apparatus for enhancing a reliability in attachment of parts for a two-wheeled vehicle.

To accomplish the foregoing objects, an attachment apparatus for two-wheeled vehicle parts in accordance with the present invention includes: first attachment means detachably attached to component parts of a two-wheeled vehicle; second fixing means fixed to parts for the two-wheeled vehicle; a pair of fitting means being mutually fitted, wherein one fitting means is provided in one of the first and second attachment means, and the other fitting means is provided in the other of the first and second attachment means; and preventing means movably provided in one of the fitting means pair, for preventing a release of the fitting of the fitting means in a predetermined moving position.

The attachment apparatus for two-wheeled vehicle parts thus structured allows the two-wheeled vehicle parts to be firmly attached to component parts of a two-wheeled vehicle by function of the preventing means.

The foregoing and other objects, features, aspects and advantages of the present invention will become more apparent from the following detailed description of the present invention when taken in conjunction with the accompanying drawings.

BRIEF DESCRIPTION OF THE DRAWINGS

There is shown in the attached drawing a presently preferred embodiment of the present invention, wherein like numerals in the various views refer to like elements, and where.

DESCRIPTION OF THE PREFERRED EMBODIMENTS

Figure 2:
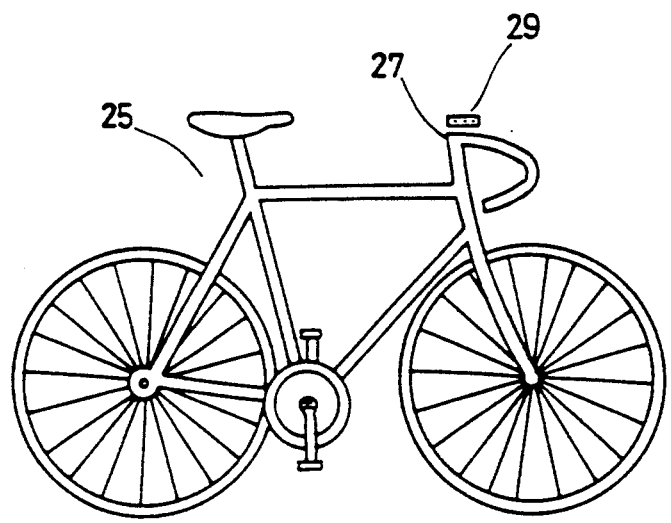
FIG. 2 is a side view showing the state of a bicycle with a head lamp attached thereto according to the one embodiment of the present invention.

FIG. 2 is a side view showing the state where a head lamp 29 is attached to a handle 27 of a bicycle 25 by an attachment apparatus according to one embodiment of the present invention.

Figure 3:
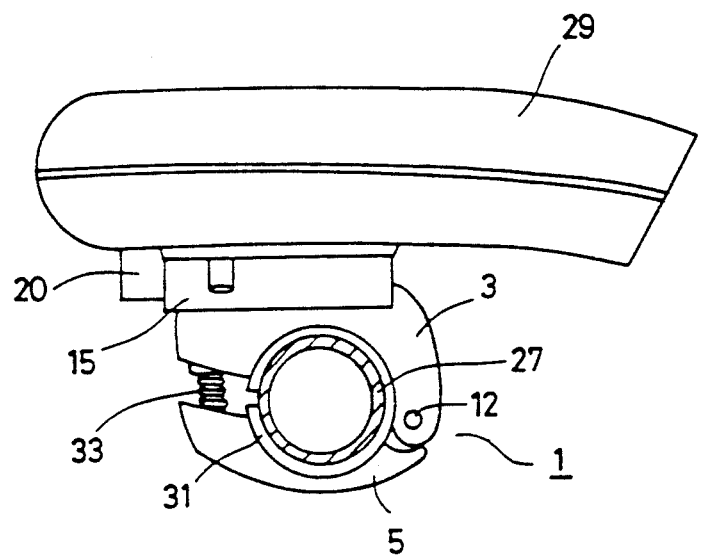
FIG. 3 is a side view showing a detailed structure in which the head lamp of FIG. 2 is attached to a handle.
Figure 4:
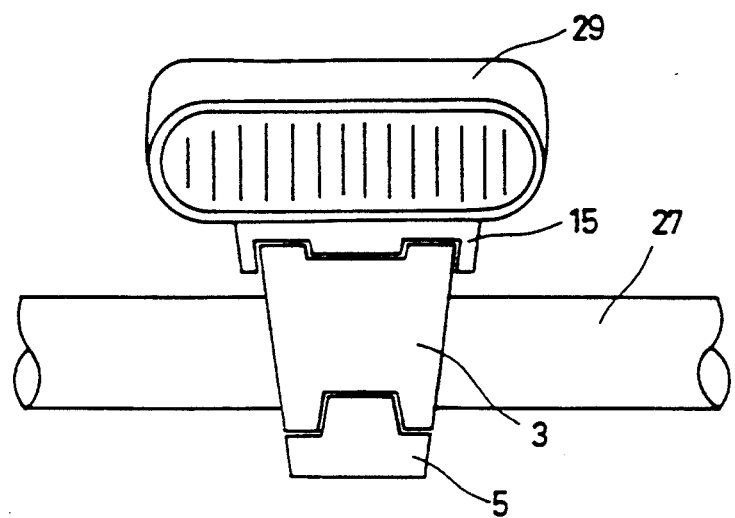
FIG. 4 is a view of the attached head lamp of FIG. 3 viewed from the front side.

FIG. 3 is a side view showing a detailed structure in which head lamp 29 is attached to handle 27 of FIG. 2; FIG. 4 is a front view of such structure; and FIG. 5 is a rear view thereof.

Referring to FIGS. 2, 3, 4 and 5, an attachment part 1 comprises an upper member 3 that is pivotal on a pin 12 and a lower member 5. For attaching attachment part A1 to handle 27 of the bicycle, with a screw 33 being detached, upper member 3 and lower member 5 are pivoted on a pin 11 so that their respective end portions may extend around the pin, and a rubber like resilient shin or filler 31 is lapped or positioned around bicycle handle 27 to be interposed between upper and lower members 3 and 5 and handle 27. Then, fastening a screw 33 causes a force to be applied to upper and lower members 3 and 5 to interpose handle 27 between upper and lower members 3 and 5, whereby attachment part A1 is firmly attached through rubber 31 to handle 27. A switching button 35 for controlling a turn-on/off of head lamp 29 is attached to a rear portion of head lamp 29. An attachment part B15 is attached to a lower portion of head lamp 29 by using a screw or the like. A lever 20 for use in detachment from attachment part A1 is provided in a rear portion of attachment part B15.

Figure 1:
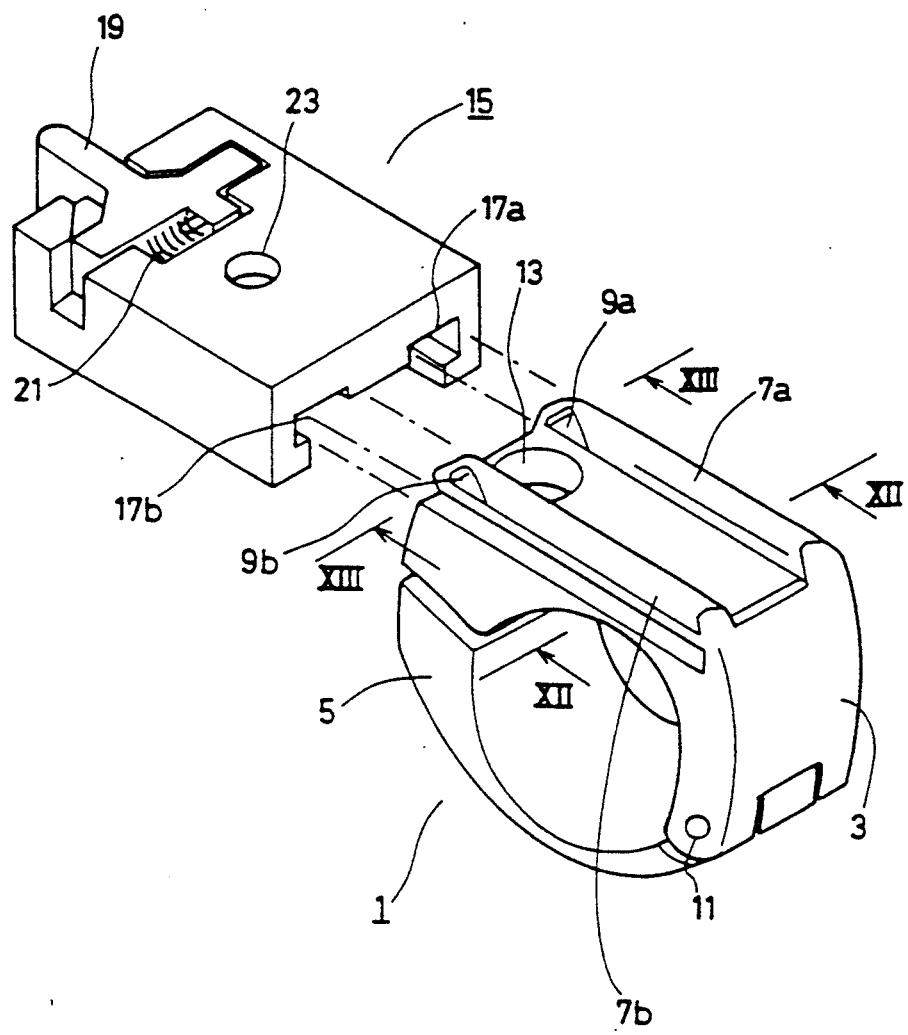
FIG. 1 is a perspective view showing the state where engagement between attachment parts A and B is released according to one embodiment of the present invention.
Figure 5:
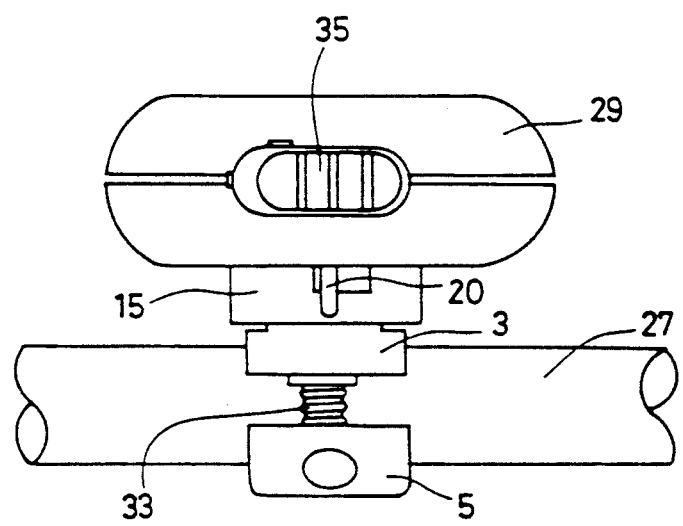
FIG. 5 is a view of the attached head lamp of FIG. 3 viewed from the back side.
Figure 12:
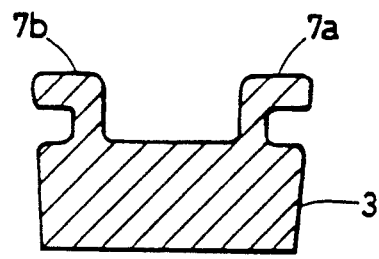
FIG. 12 is a cross-sectional view taken along the line XII—XII of FIG. 1.
Figure 13:
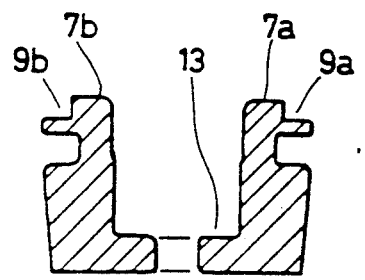
FIG. 13 is a cross-sectional view taken along the line XIII—XIII of FIG. 1.

FIG. 1 is an exploded perspective view showing the state where the engagement between attachment parts A and B shown in FIGS. 3–5 is released; FIG. 12 is a cross-sectional view taken along the line XII—XII of FIG. 1; and FIG. 13 is a cross-sectional view taken along the line XIII—XIII of FIG. 1.

Like the conventional example, a pair of rail members 7a and 7b are formed in an upper portion of attachment part A with reference to the figures. However, respective recesses 9a and 9b are provided in respective end portions of respective rail members 7a and 7b. The form of a tapped hole 13 for setting a screw for fastening upper and lower members 3 and 5 and the form of pin 11 for pivoting of those members are the same as those in the conventional example.

Grooves 17a and 17b to be engaged with rail members 7a and 7b respectively are formed in a lower portion of attachment part B15. A stopper 19 for controlling an engagement between attachment parts A and B is provided on a top surface of attachment part B. A spring 21 is incorporated in stopper 19 as shown in FIG. 1. An attachment hole 23 for attaching attachment part B15 to the head lamp is the same as the one in the conventional example.

Figure 6:
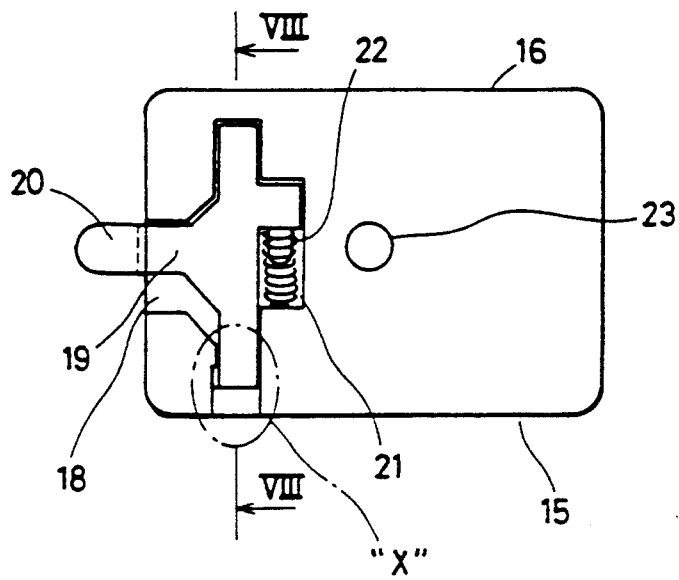
FIG. 6 is a plan view of attachment part B of FIG. 1.
Figure 7:
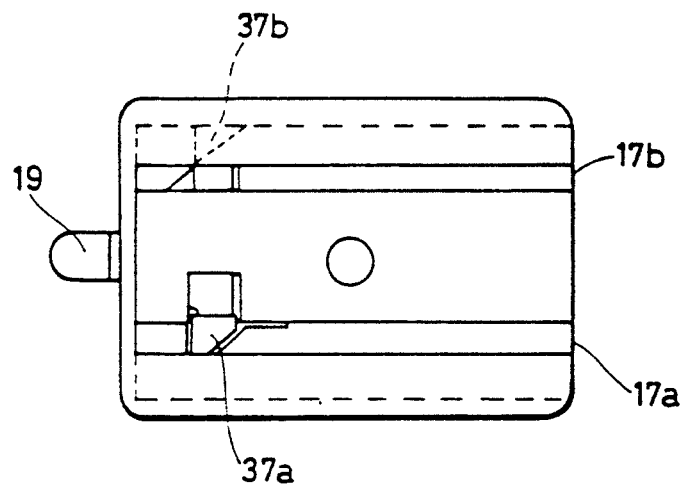
FIG. 7 is a rear view of attachment part B shown in FIG. 6.

FIG. 6 is a plan view of attachment part B shown in FIG. 1; FIG. 7 is a rear view of attachment part B; and FIG. 8 is a cross-sectional view taken along the line VIII—VIII of FIG. 6.

Figure 14:
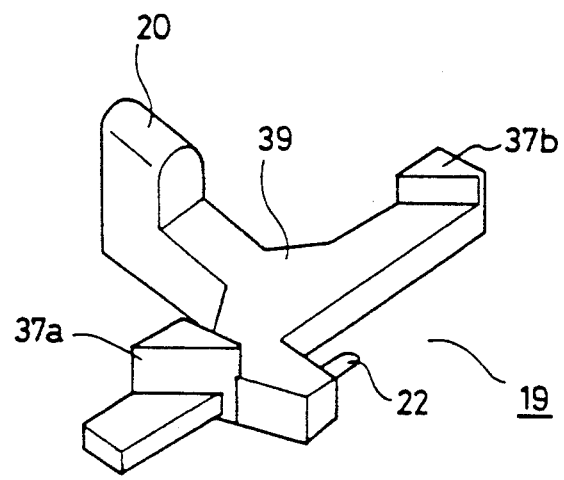
FIG. 14 is a perspective view showing structure of stopper 19 of FIG. 1.

Stopper 19 is T-shaped as viewed in plane as shown in FIG. 14. A lever 20 is provided below the central portion of the T-shape. Triangular jutted portions 37a and 37b in plane are formed in opposite end directions of the T-shape. A pin-like projection 22 which is projected to prevent the falling-off of spring 21 is provided in a portion corresponding to an upper portion of the T-shape. With reference to FIGS. 6–8, stopper 19 is moving upward in FIG. 6 by a resilient force of spring 21. At this time, as shown in FIGS. 7 and 8, jutted portions 37a and 37b of stopper 19 are positioned in directions for crossing over respective grooves 17a and 17b.

Figure 8:
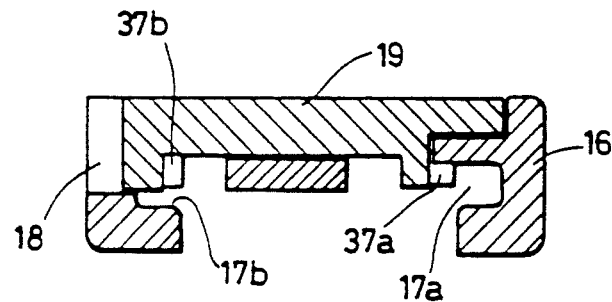
FIG. 8 is a cross-sectional view taken along the line VIII—VIII of FIG. 6.
Figure 9:
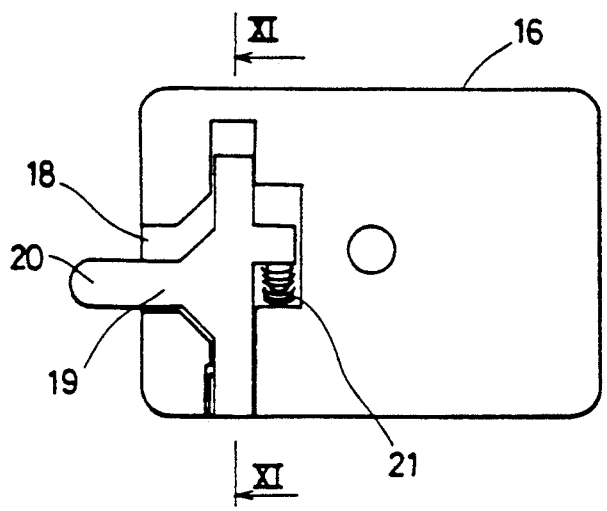
FIG. 9 is a plan view of attachment part B of FIG. 1, showing the state where a stopper 19 is moved against a resilient force of a spring.
Figure 10:
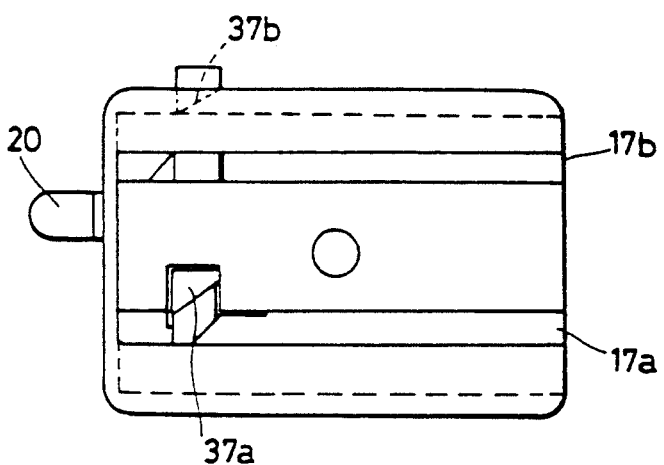
FIG. 10 is a rear view of attachment part B of FIG. 9.
Figure 11:
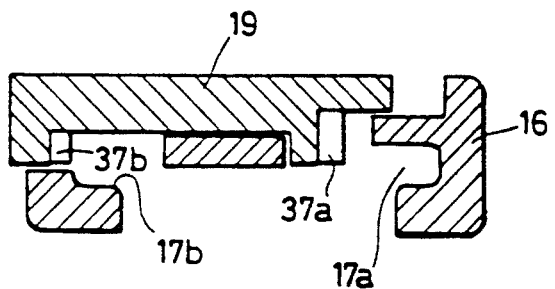
FIG. 11 is a cross-sectional view taken along the line XI—XI of FIG. 9.

FIGS. 9–11 are views corresponding to FIGS. 6–8 shown before, respectively, showing the state where stopper 19 is moved downward in FIG. 9 against the resilient force of spring 21 by using lever 20.

In this state, as shown in FIG. 10, respective jutted portions 37a and 37b of stopper 19 that are positioned in the direction for crossing over grooves 17a and 17b are moved upward in FIG. 10. Accordingly, as shown in FIG. 11 also, neither jutted portions 37a nor 37b prevent movement of rail members 7a and 7b sliding in grooves 17a and 17b.

FIGS. 15(a), 15(b) and 15(c) are views showing the state of engagement between the rail members of attachment part A and the grooves of attachment part B when attachment parts A and B are engaged with each other.

Figure 15:
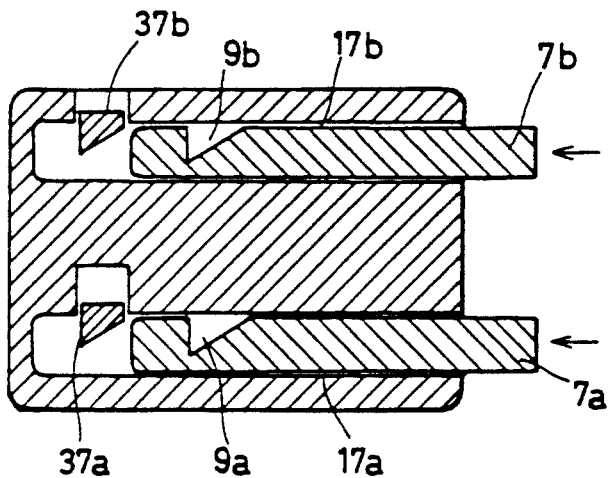
FIGS. 15(a), 15(b) and 15(c) are views showing changes in the state of engagement between rail members of attachment part A and grooves of attachment part B.
Figure 15:
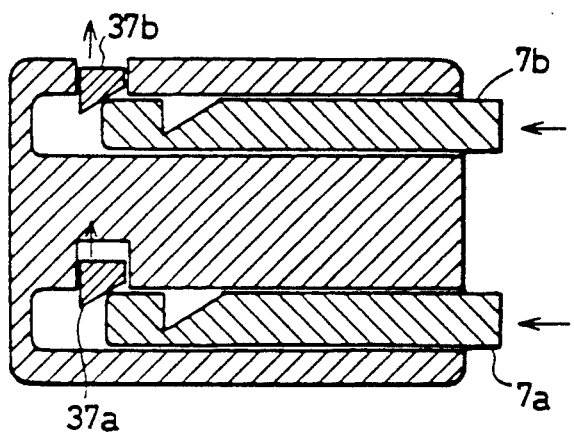
Figure 15:
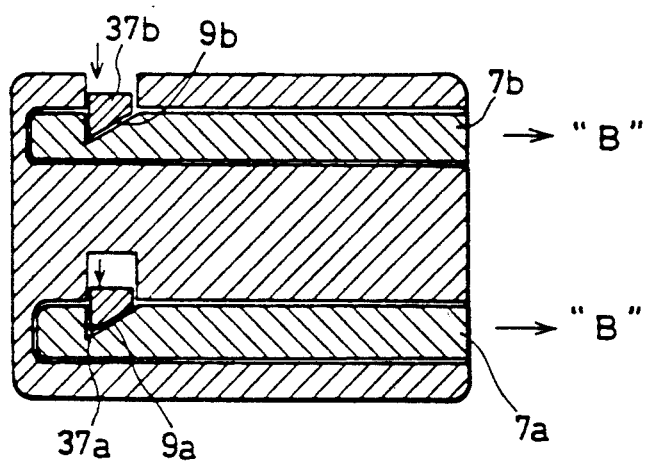

FIG. 15 (a) shows the state where rail members 7a and 7b are being engaged with grooves 17a and 17b of attachment part B, and tip end portions of rail members 7a and 7b have not yet reached jutted portions 37a and 37b of stopper 19. As shown in FIGS. 6 and 7, jutted portions 37a and 37b are positioned so that portions of jutted portions 37a and 37b may be projected in the direction for crossing over grooves 17a and 17b by the resilient force of spring 21.

FIG. 15 (b) shows the state where rail members 7a and 7b further move, so that their tip ends have reached jutted portions 37a and 37b.

In this case, the tip end portions of jutted portions 37a and 37b are formed obliquely as shown in the figure. Accordingly, by a force to be applied in the arrowed direction of rail members 7a and 7b, jutted portions 37a and 37b gradually move upward in the drawing against the resilient force of spring 21.

Referring to FIG. 15 (c), the tip ends of rail members 7a and 7b completely force jutted portions 37a and 37b upward in the drawing and pass through the corresponding portions, so that rail members 7a and 7b are completely engaged with jutted portions 37a and 37b. Jutted portions 37a and 37b forced upward in the state of FIG. 15 (b) move downward in FIG. 15 (c) by the resilient force of spring 21, and are then completely fit into recesses 9a and 9b which are of the form corresponding to the form of jutted portions 37a and 37b and are provided in rail members 7a and 7b. With attachment parts A and B thus attached to each other by the fitting of the rail members and the groove members, even if a force is applied to rail members 7a and 7b in a direction for detaching attachment part A, i.e., a "B" direction, the engagement between jutted portions 37a and 37b and recesses 9a and 9b is not released. This is because the direction of the force applied in the "B" direction and the direction of the force applied to jutted portions 37a and 37b by spring 21 are not identical but orthogonal to each other.

Detachment of attachment part B from the state of FIG. 15 (c) is enabled by moving lever 20 of stopper 19 from the state of FIG. 6 to the state of FIG. 9. That is, when stopper 19 is moved against the resilient force of spring 21 by operation of lever 20, jutted portions 37a and 37b stand away from grooves 17a and 17b as shown in FIG. 10. Accordingly, the fitting of recesses 9a and 9b is released, thereby facilitating the disengagement between rail members 7a and 7b and grooves 17a and 17b.

Figure 16:
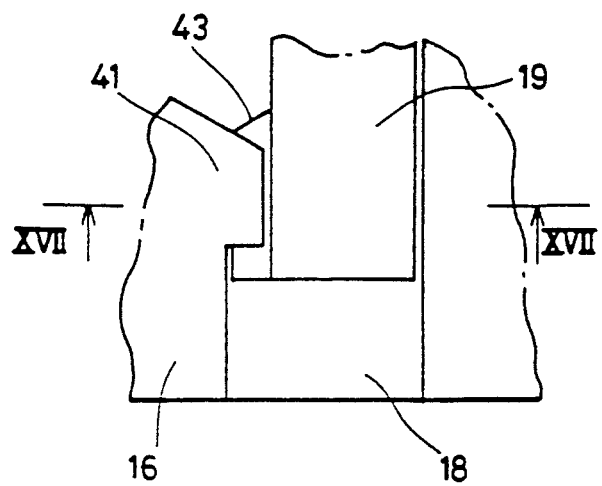
FIG. 16 is an enlarged plan view of a portion of "X" of FIG. 6.
Figure 17:
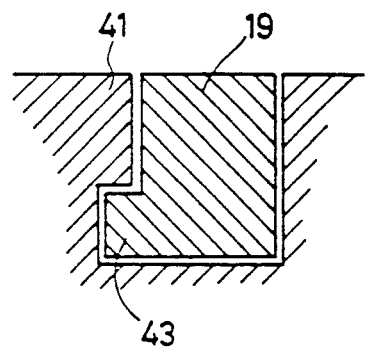
FIG. 17 is a cross-sectional view taken along the line XVII—XVII of FIG. 16.

FIG. 16 is an enlarged view of the "X" portion of FIG. 6; and FIG. 17 is a cross-sectional view taken along the line XVII—XVII of FIG. 16.

As shown in FIGS. 16 and 17, the end portion of stopper 19 has a projection 43. A projection 41 is formed in a main body 16 of attachment part B15 above projection 43 in the position of FIG. 16. Accordingly, in the state of FIG. 6, i.e., when stopper 19 is moving upward by the resilient force of spring 21, projections 43 and 41 vertically overlap with each other. Thus, in this state, even if stopper 19 disposed in a stopper receiver 18 is intended to be detached upward, the detachment is prevented by overlapping projections 43 and 41. This makes it possible to prevent stopper 19 from easily falling off attachment part B.

Figure 18:
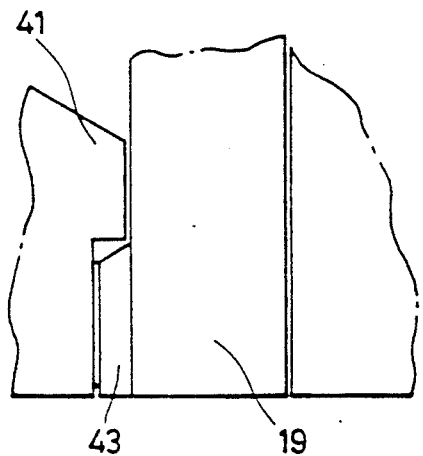
FIG. 18 is a corresponding view of FIG. 16, showing the state where stopper 19 is moved against a spring 21.

FIG. 18 shows the state where stopper 19 thus formed is moved downward against the resilient force of spring 21 by operation of lever 20 as shown in FIG. 9. In this state, there is no vertical overlapping between projection 43 of stopper 19 and projection 41 formed in main body 16 of attachment part B. Therefore, in this state, lifting stopper 19 upward allows stopper 19 to be detached from attachment part B. While projections 43 and 41 are formed on only one end portion of T-shaped stopper 19, provision of such projections also on the other end portion of stopper 19 results in a higher reliability in detachment of stopper 19.

Figure 19:
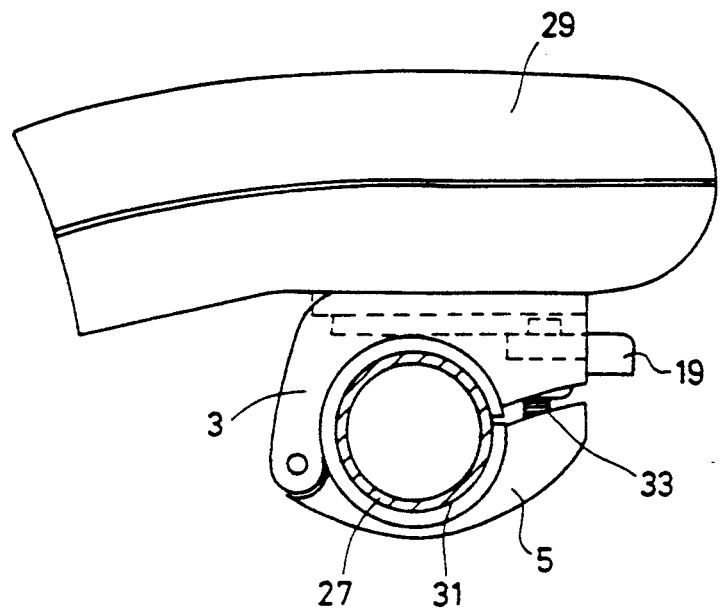
FIG. 19 is a view showing an attachment state of a head lamp 29 according to another embodiment of the present invention.
Figure 20:
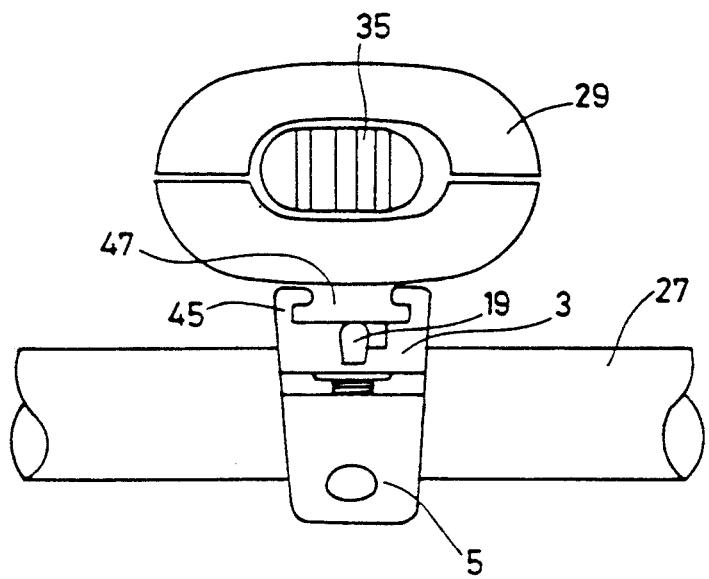
FIG. 20 is a view of the attached head lamp of FIG. 19 viewed from the back side.

FIG. 19 is a side view showing an attachment apparatus for bicycle parts according to another embodiment of the present invention; and FIG. 20 is a rear view of such attachment apparatus.

Unlike the former embodiment, an attachment part A47 having a rail member is provided on the side of head lamp 29, and a groove which is formed to fit on the rail member of attachment part A47 is formed in an attachment part B45 fixed onto handle 27, in FIGS. 19 and 20. Accordingly, in this embodiment, stopper 19 employed to disengage attachment parts A47 and B45 is provided on an upper member 3 of attachment part B45.

While it is necessary to manufacture attachment part B and head lamp 29 separately in the former embodiment, according to this embodiment thus structured, a stopper or the like is unnecessary for attachment part A47, so that attachment part A47 and lower members of head lamp 29 can integrally be formed such as by plastic resin.

Figure 21:
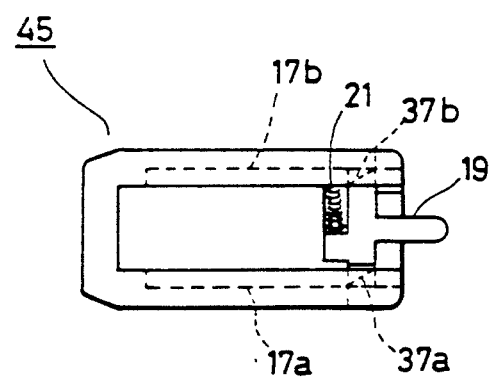
FIG. 21 is a top view of attachment part B of FIG. 20.
Figure 22:
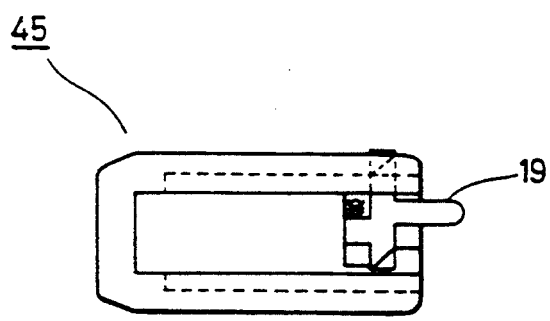
FIG. 22 is a top view of attachment part B of FIG. 20, showing the state where stopper 19 is moved against the resilient force of spring 21.
Figure 23:
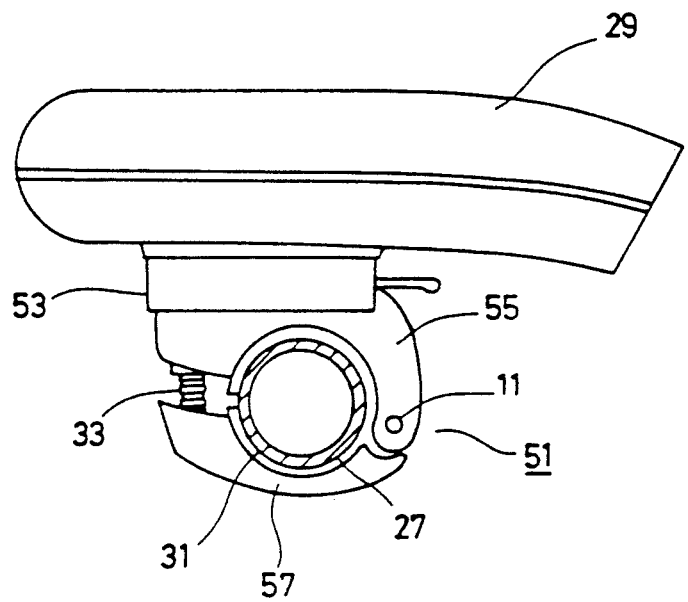
FIG. 23 is a side view showing the state of attachment of a conventional head lamp 29.
Figure 24:
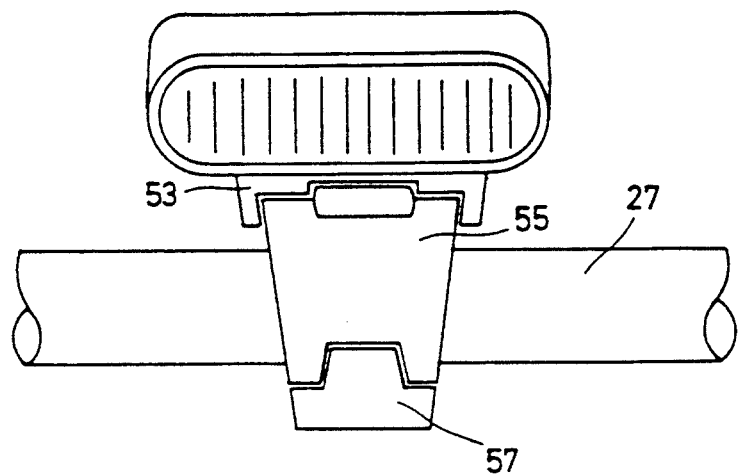
FIG. 24 is a view of the attached head lamp of FIG. 23 viewed from the front side.
Figure 25:
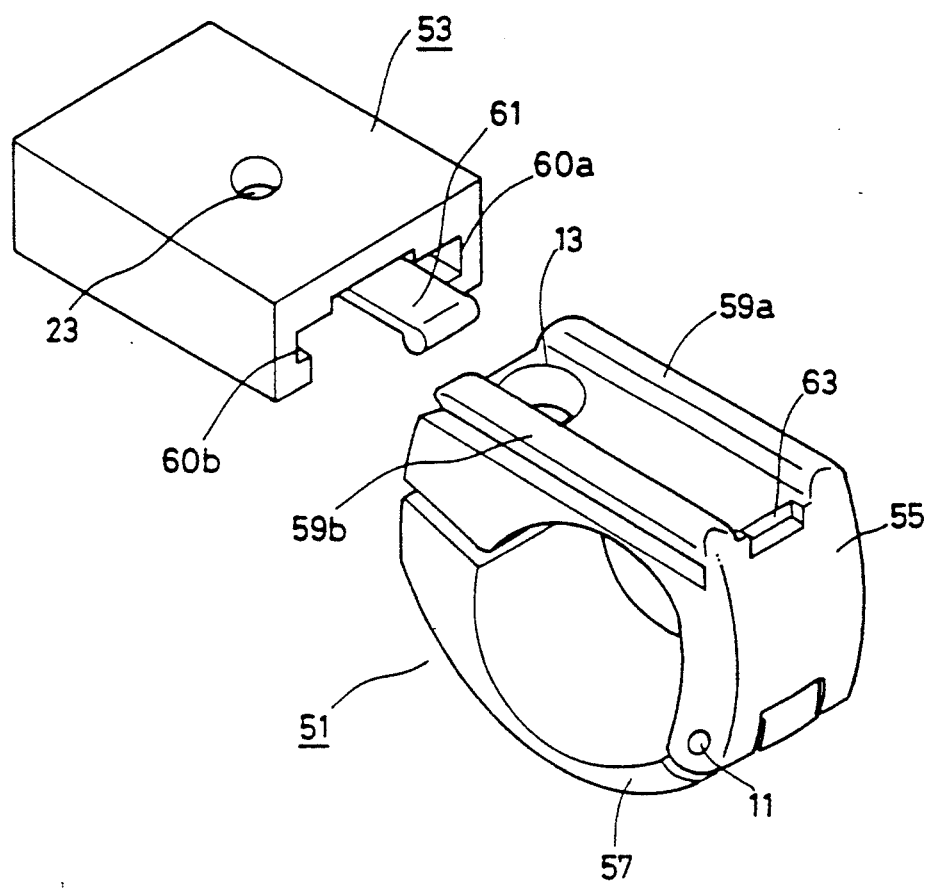
FIG. 25 is a perspective view of the state where engagement between attachment parts A and B shown in FIG. 23 is released.
Figure 26:
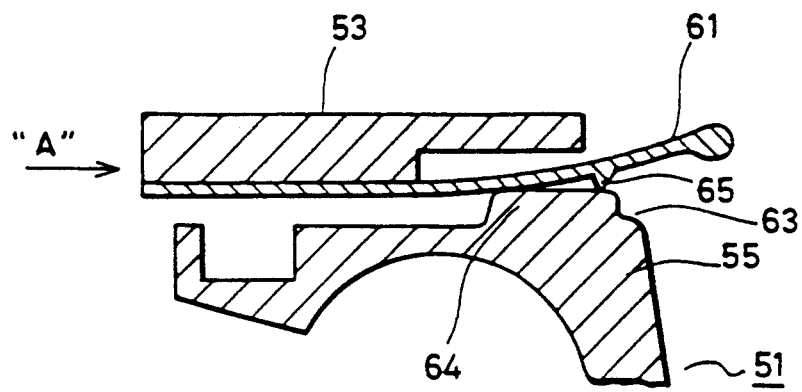
FIG. 26 is a cross-sectional view showing the state where the engagement between attachment parts A and B of FIG. 25 is moved.
Figure 27:
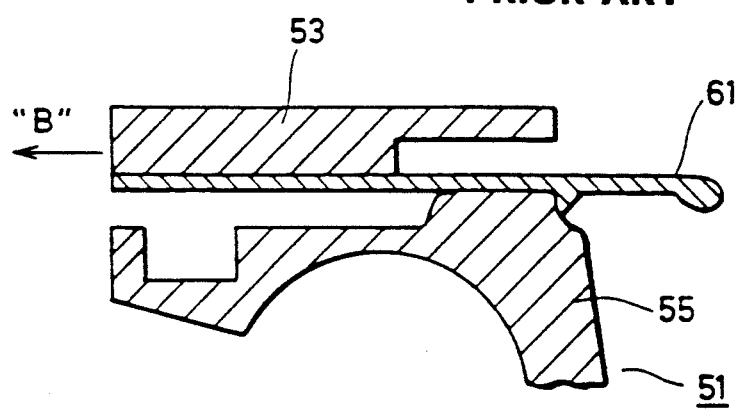
FIG. 27 is a cross-sectional view showing the state where the engagement between attachment parts A and B of FIG. 25 is completed.

FIG. 21 is a plan view of upper member 3 of attachment part B45 of FIG. 20; and FIG. 22 is a plan view showing the state where stopper 19 is moved upward in the drawing against the resilient force of spring 21.

Since the fitting state or the like of the rail member formed on attachment part A47 as an operation of the engagement between jutted portions 37a and 37b formed in stopper 19 and grooves 17a and 17b is the same as the one shown in the former embodiment, a description thereof will not be repeated. In the attachment apparatus thus structured, since stopper 19 is provided on the fixing side, the shape of the attachment part on the side of bicycle parts becomes simple and more economical particularly when various bicycle parts are exchanged and attached to the bicycle.

While stopper 19 is always enforced in a definite direction by employing a spring in the foregoing embodiment, other enforcing means than the spring can be employed and, even if such enforcing means is not employed, a highly reliable attachment effect as compared with the conventional example can be expected.

While a head lamp is used as bicycle parts in the foregoing embodiment, the present invention is similarly applicable to other bicycle parts as a matter of course.

While the present invention is applied to the attachment of component parts of the bicycle in the foregoing embodiment, the present invention is applicable as a method of attaching various types of parts to not only bicycles but also any two-wheeled vehicles and other objects.

Although the present invention has been described and illustrated in detail, it is clearly understood that the same is by way of illustration and example only and is not to be taken by way of limitation, the spirit and scope of the present invention being limited only by the terms of the appended claims.

I claim:

1. An attachment apparatus of parts for a two-wheeled vehicle, comprising:

first attachment means detachably attached to component parts of a two-wheeled vehicle;

second attachment means fixed to parts for the two-wheeled vehicle;

a pair of fitting means fitting with each other, wherein one fitting means is provided in one of said first and second attachment means, and the other fitting means is provided in the other of said first and second attachment means; and preventing means movably provided in one of said fitting means pair, for preventing a release of the fitting of said fitting means in a predetermined moving position, said one of said fitting means pair having a single rail-shaped projection having at least one end open, and the other of said fitting means pair having a single groove having at least one end open and slidably fitting on said rail-shaped projection, wherein a recess is formed in a portion of said projection, and a jutted portion is formed on the other of said fitting means pair, said jutted portion being engaged with said recess for preventing release of the fitting of said pair of fitting means.

2. The attachment apparatus of claim 1, further comprising enforcing means for biasing said preventing means so that said preventing means moves to said predetermined moving position.

3. An attachment apparatus of parts for a two-wheeled vehicle, comprising:

a first attachment part attached to component parts of a two-wheeled vehicle;

a second attachment part provided to be attached to said first attachment part and fixed to the two-wheeled vehicle parts;

a first fitting portion formed on one of said first and second attachment parts and having a single rail-shaped projection with at least one end open, wherein a recess is formed in a portion of said projection; and a second fitting portion formed in the other of said first and second attachment parts, and including a single groove having at least one end open and slidably fitting on said rail-shaped projection, and including a projected piece having a jutted portion formed on a tip end of said projected piece and movable in a direction of crossing over said groove, said jutted portion being engaged with said recess of said projection in said groove, wherein when said second attachment part is attached to said first attachment part by a fitting of said first and second fitting portions, said projected piece moves with said projection being fit into said groove, so that said recess and said jutted portion are engaged with each other, preventing a release of the fitting of said first and second fitting portions, and wherein a first projection is formed in a portion of said projected piece, and a second projection is formed in a position of said second attachment part corresponding to said first projection, with said recess and said jutted portion engaged with each other, so that said second fitting portion is prevented from falling off said second attachment part.

4. The attachment apparatus of claim 3, wherein a coil spring for biasing said projected piece so that said projected piece moves in a direction in which said recess and said jutted portion are engaged with each other is attached to said second attachment part.

5. The attachment apparatus of claim 4, wherein the engagement of said recess and said jutted portion is released in response to the movement of said projected piece against a resilient force of said coil spring.

6. The attachment apparatus of claim 3, wherein said component parts of said two-wheeled vehicle comprise a handle of a bicycle.

7. The attachment apparatus of claim 6, wherein said two-wheeled vehicle parts comprise a head lamp for a bicycle.

* * * * *